United States Patent
Leunig

[11] 3,871,806
[45] Mar. 18, 1975

[54] INJECTION MOLDING APPARATUS
[75] Inventor: Carl V. Leunig, Louisville, Ky.
[73] Assignee: General Electric Company, Louisville, Ky.
[22] Filed: Jan. 28, 1974
[21] Appl. No.: 437,474

[52] U.S. Cl.............................. 425/247, 425/242 R
[51] Int. Cl............................................... B29c 5/00
[58] Field of Search........ 425/242 R, 246, 245, 247, 425/258, 261, 256

[56] References Cited
UNITED STATES PATENTS

| | | | |
|---|---|---|---|
| 3,355,765 | 12/1967 | Hendry | 425/246 |
| 3,412,432 | 11/1968 | Fuglsang-Madsen | 425/246 |
| 3,507,010 | 4/1970 | Doleman et al. | 425/246 X |
| 3,762,000 | 10/1973 | Mensin et al. | 425/246 X |
| 3,808,962 | 5/1974 | Liepa | 425/246 X |

FOREIGN PATENTS OR APPLICATIONS

| 30,589 | 0/1970 | Japan | 425/246 |
|---|---|---|---|

Primary Examiner—Francis S. Husar
Assistant Examiner—David B. Smith

[57] ABSTRACT

An injection molding apparatus has a plasticator, a mold system having a plurality of sprue openings, and a runner block that is movable along the mold system and about a preselected axis between at least a first position at which at least one of the secondary openings is in communication with an associated sprue opening and at least a second position at which said at least one secondary opening is laterally spaced and sealed from fluid communication with said sprue opening.

6 Claims, 4 Drawing Figures

INJECTION MOLDING APPARATUS

BACKGROUND OF THE INVENTION

In the extrusion of organic plastic molding material into a mold of a mold system, it is desirable to fill a single, large-size mold through a plurality of sprue openings, simultaneously fill a multiplicity of separate molds from a single plasticator, or sequentially fill groups of molds with a single plasticator. In each of these operations, positive, preselected shut-off of the molding material flowing from the plasticator into the mold or molds is often difficult. This is true where the organic plastic molding material is a foamable molding material that is desired to be injected into the mold under low pressure to assure desired forming of said molding material. These low pressure foam molding plastic materials and temperatureviscosity sensitive materials, for example, preferably require shut-off apparatus as close to the mold as practical in order to prevent "drool" of the molding material after shut-off which causes a waste of valuable material and a need for the expenditure of time to repeatedly clean the excess drooled material from the apparatus.

Sleeve and spring operated shut-off apparatus, such as shown in U.S. Pat. No. 2,803,854-Smous and U.S. Pat. No. 2,988,779-Barton et al., have been heretofore utilized with molding apparatus. Where, however, the molding apparatus preferably required the simultaneous or sequential filling of one or more molds through a plurality of sprues, there often was not sufficient space to provide for the attachment of the more complex shut-off apparatus while maintaining the shut-off apparatus immediately adjacent the mold. Further, where a plurality of non-unitary shut-off apparatus are utilized, additional equipment is needed, timing of one shut-off relative to the others may require additional equipment and maintenance, and the shut-off may be less than complete, all of which can represent a waste of materials, operational time, and labor.

SUMMARY OF THE INVENTION

An injection molding apparatus has a plasticator, a mold system having a plurality of sprue openings, and a runner block that is movable along the mold system about a preselected axis between at least a first position at which at least one of the secondary openings is in communication with an associated sprue opening and at least a second position at which said at least one secondary opening is laterally spaced and sealed from fluid communication with said sprue opening.

DETAILED DESCRIPTION OF THE DRAWINGS

Figure 2:
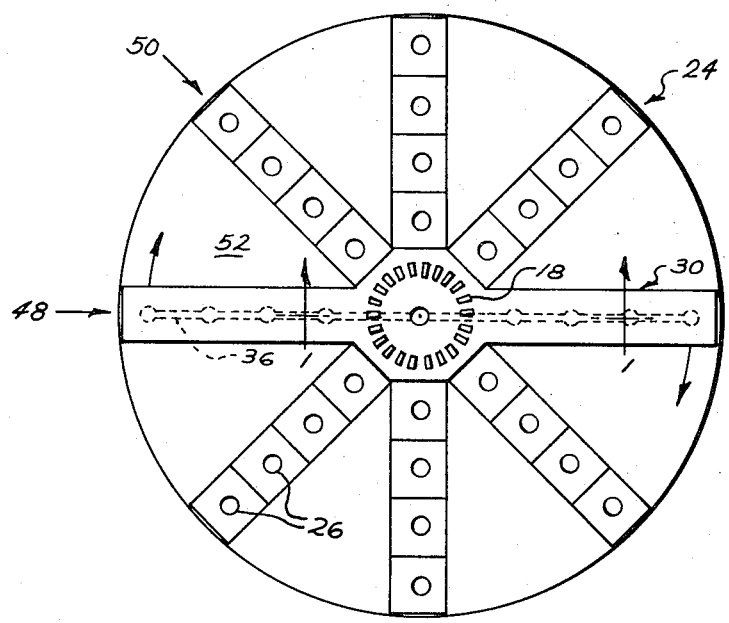
FIGS. 2 and 3 are diagrammatic top views of two embodiments of the apparatus of this invention that are constructed for sequential injection of molding material.
Figure 1:
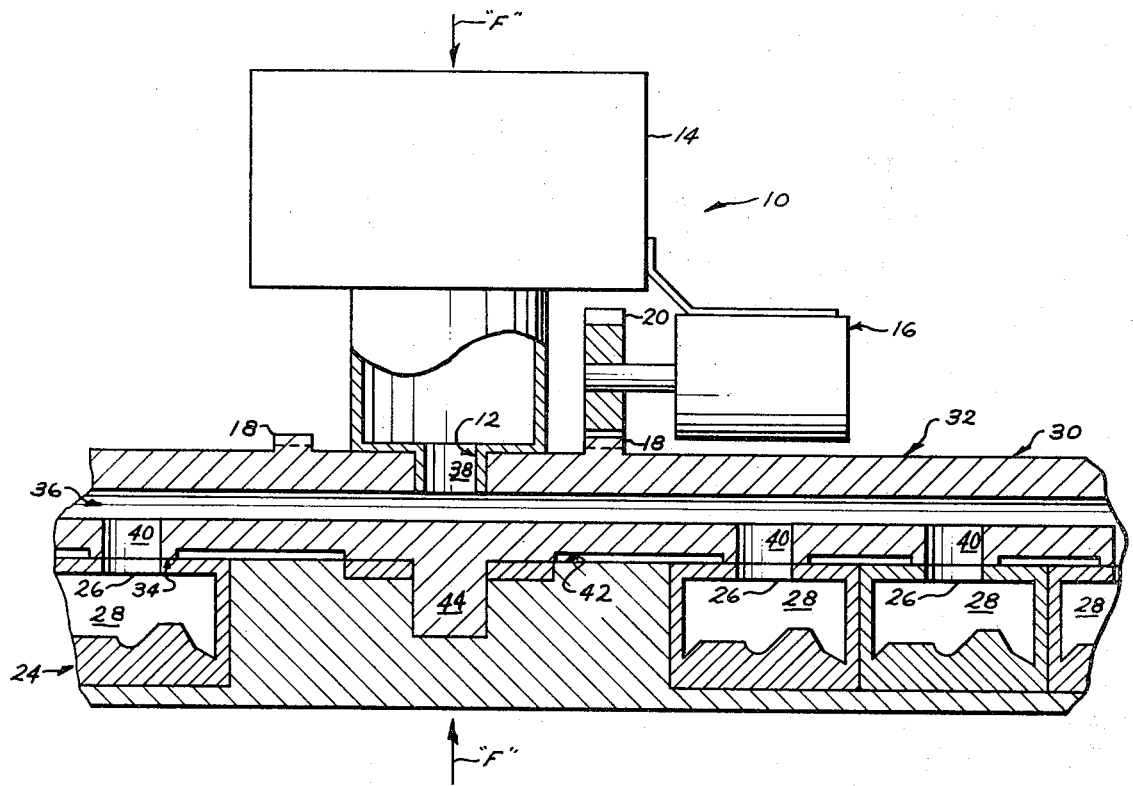
FIG. 1 is a partially sectioned diagrammatic view of an injection molding apparatus having the shut-off apparatus of this invention.

Referring to FIGS. 1 and 2, the injection molding apparatus has a plasticator 10, a nozzle 12, a power means 14 for operating the plasticator 10, and a power means 16, such as, for example, driven and driving gears 18, 20, for moving the associated runner block 30, as hereafter more fully discribed. The plasticator 10 is associated with a mold system 24 which has a plurality of sprue openings 26 for filling the mold cavities 28 from the plasticcator 10 via the sprue openings 26.

A runner block 30 has first and second surfaces 32, 34, at least one channel 36 extending laterally within the runner block 30, a feed opening 38 extending through the block 30 between the first surface 32 and the channels 36, and at least a plurality of spaced-apart, secondary openings 40 extending through the block 30 between the second surface 34 and the channel 36.

In the assembled position, the feed opening 38 receives the plasticator nozzle 12 and the second surface 34 of the runner block 30 is planar and is maintained in slidable contact with a planar first surface 42 of the mold system 24 through which extend the sprue openings 26.

In order to facilitate slidable movement of the second surface 34 of the runner block 30 over the first surface 42 of the mold system, one or both of said surfaces 34, 42 can be treated or made with material which will reduce the coefficient of friction between the surfaces, for example poly (tetrafluoroethylene) or graphited steel.

The plasticator 10, runner block 30, and mold system 24 are urged toward one another with forces sufficient to prevent leakage of the molding material between the elements at the expected operating pressures and temperatures. The elements for urging the system together with the forces E can be any system as is known and used in the art.

As shown in FIG. 2, the runner block 30 is rotatably connected to the mold system 24 by pin 44. Alternatively, a bushing or other apparatus as is known in the art for permitting rotational movement of the runner block 30 relative to the mold system 24 may be used.

In operation, the runner block 30 is moved along the mold system about center 44 between a first position (shown in FIG. 1), at which at least one of the secondary openings 40 is in fluid communication with an associated sprue opening 26 of the mold cavity 28, and a second position at which said secondary openings 40 are spaced from said sprue openings 26.

FIGS. 1 and 2 show one example of a mold system 24 which can be used with this invention wherein said mold system 24 comprises a plurality of individual separate mold cavities 28 each having at least one sprue opening 26.

In operation of the embodiment of the invention shown in FIGS. 1 and 2, organic plastic material is passed from the plasticator 10 through the nozzle 12, feed opening 38, channel 36, secondary openings 40, associated aligned sprue openings 26, and into associated mold cavities 28. After filling the associated cavity 28 with a preselected volume of material, runner block 30 is moved by power means 16 from one sub-mold system 48, for example, to another sub-mold system 50, for example.

During rotation of the runner block 30, the secondary openings 40 are spaced from the sprue openings 26 of the sub-mold system 48, thereby closing the sprue openings 26 from communicating with the organic plastic molding material.

It will be apparent from a study of FIG. 1 that the cooperation of the two surfaces 34 and 42 causes a scissors-type action that cleanly and completely terminates passage of the molding material, thereby preventing undersirable drool of the material.

Figure 3:
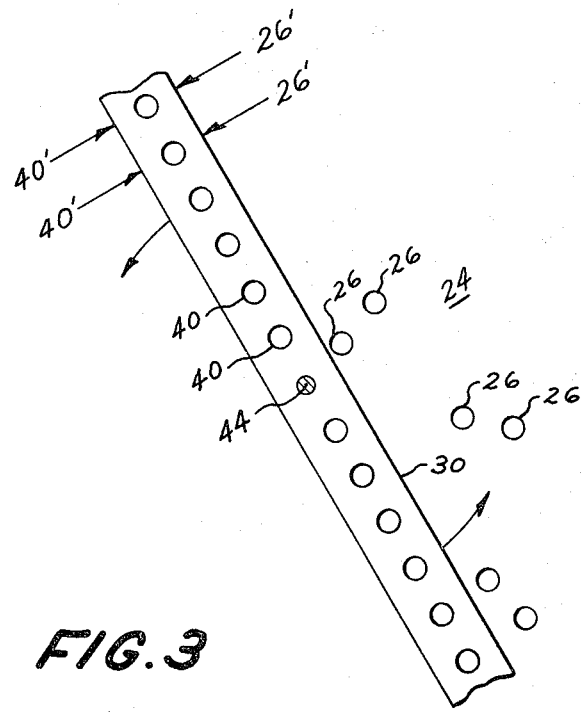

FIG. 3 shows another example mold system 24 which can be used with this invention wherein the runner block 30 is movable to at least a third position at which at least another one of the secondary openings 40' is in fluid communication with an associated other sprue opening 26' for filling separate mold cavities in a preselected sequential order.

Figure 4:
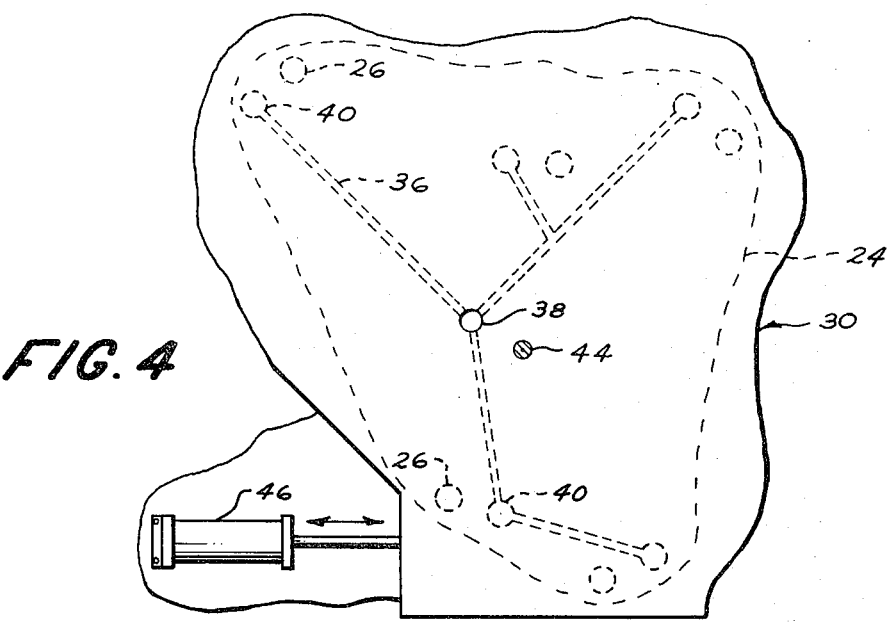
FIG. 4 is a diagrammatic top view of another embodiment of the apparatus of this invention.

FIG. 4 shows yet another example of a mold system 24 which can be used with this invention wherein a single mold cavity 28 has a plurality of sprue openings 26.

Referring to FIG. 4, a hydraulic cylinder 46 can be attached to the runner block 30 for rotating the runner block 30 about pin 44 through a small arc as opposed to complete rotation of the runner block 30. This embodiment is particularly useful in forming a single, large part in a mold which has a plurality of sprue openings 26.

In operation of the embodiment of the invention shown in FIG. 4, molding material is injected into a single, large mold cavity simultaneously through a plurality or multiplicity of sprue openings 26. After the cavity is filled, the runner block 30 is moved by power means 46 to a sealed position, as shown, wherein all of the secondary openings 40 are spaced from and sealed from fluid communication with their associated sprue openings 26. Since the runner block 30 is a unitary element, shut-off of flow from the plasticator into the mold system via all sprue openings 26 is simultaneous.

While there has been shown and described a number of embodiments of the present invention, it is to be understood that the invention is not limited thereto and it is intended by the appended claims to cover all such modifications falling within the spirit and scope of the invention.

Therefore, we claim that:

1. In injection molding apparatus having a plasticator, a plasticator nozzle, and a mold system having a continuous planar surface interrupted only by a plurality of sprue openings opening at the planar surface for receiving material from the nozzle via the sprue openings, the improvement comprising:

a runner block having first and second surfaces, at least one channel extending laterally within the block, a feed opening extending through the block in communication with the channel, and at least a plurality of spaced-apart secondary openings each extending through the block between the second surface and said channel, said feed opening receiving the nozzle, and said second surface of the block being planar and slidably movable along the planar surface of the mold system about a preselected axis between at least a first position at which at least one of the secondary openings is in communication with an associated sprue opening and at least a second position wherein said secondary openings are sealed by mating engagement with the uninterrupted portion of said planar surface; and means for slidably moving the block along the mold system and about the axis between at least the first and second positions.

2. Apparatus, as set forth in claim 1, wherein the mold system comprises a plurality of individual molds with each of said individual molds having at least one sprue opening.

3. Apparatus, as set forth in claim 1, wherein the mold system comprises a single mold having a single mold cavity.

4. Apparatus, as set forth in claim 1, wherein the runner block is rotatable around the preselected axis.

5. Apparatus, as set forth in claim 1, wherein the runner block is pivotally movable about the preselected axis.

6. Apparatus, as set forth in claim 1, wherein the block is movable to at least a third position at which at least another one of the secondary openings is in communication with an associated sprue opening.

* * * * *